United States Patent [19]
Kalkunte

[11] Patent Number: 6,094,692
[45] Date of Patent: Jul. 25, 2000

[54] NETWORK INTERFACE HAVING ADAPTIVE TRANSMIT START POINT FOR EACH PACKET TO AVOID TRANSMIT UNDERFLOW

[75] Inventor: Mohan Kalkunte, Sunnyvale, Calif.

[73] Assignee: Advanced Micro Devices, Inc., Sunnyvale, Calif.

[21] Appl. No.: 09/098,435

[22] Filed: Jun. 17, 1998

Related U.S. Application Data

[62] Division of application No. 08/598,290, Feb. 8, 1996, Pat. No. 5,859,980.

[51] Int. Cl.[7] .............................. G06F 13/40; G06F 13/20
[52] U.S. Cl. ........................... 710/34; 370/232; 370/253; 710/52
[58] Field of Search ..................... 370/406, 464, 370/445, 232, 253; 709/232, 234; 714/49, 757; 348/419; 710/30, 34, 52, 29, 35, 57, 53; 318/727; 711/156

[56] References Cited

U.S. PATENT DOCUMENTS

| | | | |
|---|---|---|---|
| 5,058,110 | 10/1991 | Beach et al. | 370/464 |
| 5,136,582 | 8/1992 | Firoozmand | 370/412 |
| 5,138,615 | 8/1992 | Lamport et al. | 370/400 |
| 5,159,447 | 10/1992 | Haskell et al. | 348/419 |
| 5,210,479 | 5/1993 | Firoozmand | 318/727 |
| 5,257,258 | 10/1993 | Birman et al. | 370/235 |
| 5,315,580 | 5/1994 | Phaal | 370/232 |
| 5,434,872 | 7/1995 | Petersen et al. | 714/811 |
| 5,859,980 | 1/1999 | Kalkunte | 709/232 |

FOREIGN PATENT DOCUMENTS 0577115  1/1994  European Pat. Off. .

OTHER PUBLICATIONS

AMD, AM79C970 PCnet™–PCI Single–Chip Ethernet Controller for PCI Local Bus, Jun. 1994, pp. 1–868–1–1033.

*Primary Examiner*—Daniel H. Pan

[57] ABSTRACT

A network interface transmits data packets between a host computer and a network and includes a first in first out (FIFO) buffer memory with an adaptive transmit start point determined for each data packet. The network interface received data packets from the host computer via a peripheral component interconnect (PCI). A FIFO control determines the byte length of each data packet, measures the minimum fill time indicating the time necessary to fill the FIFO buffer memory with a predetermined minimum amount of data necessary before transmission by the FIFO buffer memory, and calculates the time to fill the FIFO buffer memory with each packet based on the determined length and the measured minimum fill time. The time to empty the packet from the FIFO buffer memory is also calculated based upon the length of the packet and predetermined network transmission rates. If the time to empty the packet from the FIFO buffer memory is greater than or equal to the time to fill the FIFO buffer memory, the transmit start point is set to the predetermined minimum amount, otherwise the transmit start point is adjusted in accordance with the difference in time between filling and emptying the FIFO buffer memory with the packet, a FIFO fill rate based on the measured minimum fill time, and a coefficient that accounts for latencies in the PCI bus. The network interface thus provides an optimal transmit start point for each data packet, minimizing latency and underflow conditions during network transmission.

7 Claims, 4 Drawing Sheets

Fig. 4

| PREAMBLE 1010...1010 | SYNC 10101011 | DESTINATION ADDRESS | SOURCE ADDRESS | LENGTH | LLC DATA | PAD | FCS |
|---|---|---|---|---|---|---|---|
| 56 BITS | 8 BITS | 6 BYTES | 6 BYTES | 2 BYTES | 46 – 1500 BYTES | | 4 BYTES |

NETWORK INTERFACE HAVING ADAPTIVE TRANSMIT START POINT FOR EACH PACKET TO AVOID TRANSMIT UNDERFLOW

This application is a division of application Ser. No. 08/598,290 filed Feb. 8, 1996 now U.S. Pat. No. 5,859,980.

FIELD OF THE INVENTION

The present invention relates to network interface devices between host computers and network communication lines. More particularly, the present invention relates to buffering and data transmission techniques to minimize transmit underflow and packet latency of data packets transmitted between a host computer and a network.

DESCRIPTION OF THE RELATED ART

Network interface devices handle packets of data for transmission between a host computer and a network communication system, such as a local area network. One primary function of the network interface, also referred to as a network controller, is to buffer data to compensate for timing discrepancies between the host computer and the network.

U.S. Pat. No. 5,210,749 to Firoozmand, the disclosure of which is incorporated in its entirety by reference, discloses a conventional network controller comprising a buffer memory configured as logical first-in-first-out memories (FIFOs) for storing transmit and receive data. The transmit FIFOs are capable of transmitting data to the network before a full frame of data is received from the host system memory. The term "frame" refers to the package of data in a local area network that is moved from the one node of the network to another.

The throughput of the network controller is the rate at which the network controller is able to transfer data, in the form of frames or packets, in both directions between the host computer and the network. The latency of the network controller is the time delay between the time a frame of data is first "given" to the network controller and the time the frame of data "appears" on the network, or vice versa. Hence, latency increases when a network controller will wait until a complete frame is received before it initiates a transfer of data to the network.

The length of each frame or packet of data may vary. Hence, Firoozmand proposes a transmit data threshold detecting means for detecting presence in the transmit FIFO of at least a predetermined amount of data, less than the full frame, that is sufficient to enable the frame to become completed while the data in the buffer is being transferred to the network. The predetermined transmit data threshold, selected in part by system and network latencies, is the amount of data stored in the transmit FIFO sufficient to prevent data "underrunning", i.e., running out of data in the transmit FIFO, during transfer of data from the FIFO to the network. Hence, data is transmitted from the transmit FIFO to the network when the transmit data threshold detecting means detects the presence of data in the transmit FIFO equal to the predetermined transmit data threshold.

Thus, the prior art teaches that the data is transmitted from the transmit FIFO when a full frame of data is received in the FIFO, or when the FIFO contains an amount of data corresponding to a predetermined transmit data threshold.

There exists a problem, however, that the detection of the transmit FIFO containing data at the predetermined transmit data threshold may not be entirely satisfactory. As noted earlier, different packet sizes are transmitted between the network interface and the host computer. Hence, the predetermined transmit data threshold does not entirely eliminate the problems of underflow and latency for the different packet sizes. Thus, if the threshold is too high, then packet latency can still be a problem.

In addition, problems may arise if the time to load the bytes into the transmit FIFO is variable. For example, the network interface may be coupled to a local bus, such as a peripheral component interconnect (PCI) bus, in order to provide substantial improvement in data transmission speeds to and from the host computer. However, the PCI bus is generally "bursty" and has its own PCI bus latency time. Therefore, the use of a fixed transmit threshold may require an artificially high threshold to minimize underflow. Consequently, the relatively high threshold may increase packet latency, thereby reducing the efficiency of the network interface.

DISCLOSURE OF THE INVENTION

There is a need for a network interface capable of determining an optimal transmit start point for a transmit FIFO based on the length of a received data packet, the time necessary to fill the transmit FIFO with a predetermined minimum amount of data, and the transmission rate of the FIFO buffer.

There is also a need for a method of determining a transmit start point for a FIFO buffer in a network interface card based on the length of each data packet, the total time to fill the FIFO buffer with the data packet, and the total time to remove each data packet from the FIFO buffer.

These and other needs are met by the present invention, in which the transmit start point for the FIFO buffer is determined for each packet to be transmitted by the FIFO buffer. The calculation of the transmit start point for each packet ensures that packet latency is minimized with minimal underflow.

According to one aspect of the present invention, a method for determining a transmit start point for a FIFO buffer in a network interface includes the steps of determining a length of each data packet, determining a total fill time to fill the FIFO buffer with each data packet in accordance with the determined length, determining a total removal time to remove each data packet from the FIFO buffer in accordance with the determined length, and setting a transmit start point for transmission of each data packet from the FIFO buffer in accordance with the total fill time and total removal time.

In another aspect of the present invention, the method for setting a transmit start point in the FIFO buffer of an interface includes the steps of determining a byte length of each received packet, measuring a minimum fill time corresponding to a minimum time necessary to fill the FIFO buffer with a predetermined minimum number of bytes of each received packet before FIFO buffer transmission thereof, determining an output transmission rate of the FIFO buffer, and setting the transmit start point for each received packet in accordance with the determined byte length of each received packet, the minimum fill time and the output transmission rate.

In still another aspect of the present invention, a network interface includes a computer bus interface receiving data packets from a host computer, each data packet composed of a plurality of data bytes, a FIFO buffer receiving the data bytes of each packets from the computer bus interface and having a predetermined byte storage requirement before transmission of the data bytes, a network bus interface outputting data from the FIFO buffer onto a network bus at a network transmission rate, and a threshold calculator setting a transmit start point of the FIFO buffer for each data packet. The threshold calculator includes a packet length measurement portion determining a byte length for each data packet, and a time interval counter measuring a time interval for the FIFO buffer to receive a number of bytes of each data packet corresponding to the predetermined byte storage requirement. The threshold calculator sets the transmit start point in response to the determined byte length of each data packet, the determined first time interval, the network transmission rate, and the predetermined byte storage requirement Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 4 is a diagram of a data packet transmitted by the network interface of FIG. 1.

BEST MODE FOR CARRYING OUT THE INVENTION

Figure 1:
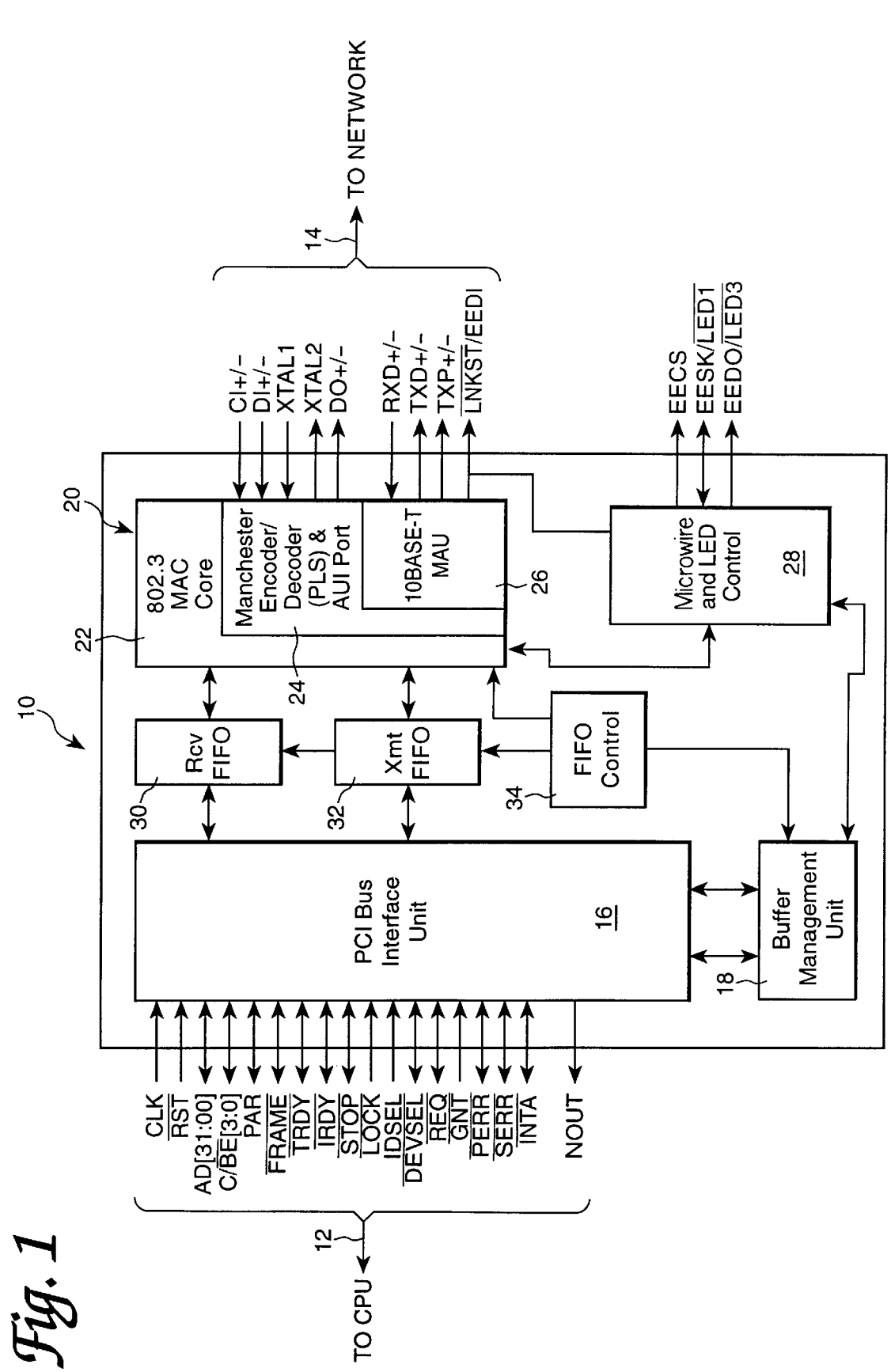
FIG. 1 is a block diagram of a network interface according to a preferred embodiment of the present invention.

FIG. 1 is a block diagram of an exemplary network interface 10 that calculates the adaptive transmit start point for each packet according to a preferred embodiment of the present invention. The calculation of the adaptive transmit start point (XMTSP) for each packet results in almost none or a minimal transmit underflow while achieving low packet latency.

The network interface 10, preferably a single-chip, 32-bit Ethernet controller, provides an interface between a local bus 12 of a computer, for example, a peripheral component interconnect (PCI) local bus, and an Ethernet-based network bus 14. An exemplary network interface is the Am79C970 PCnet™-PCI Single-Chip Ethernet Controller for PCI Local Bus from Advanced Micro Devices, Inc., Sunnyvale, Calif.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 preferably follows the specification ISO 8802-3 (IEEE-ANSI 802.3). An exemplary data frame following this standard ISO 8802-3 is shown in FIG. 4. The interface 10 also includes a microwire EEPROM interface 28, a receive first in first out (FIFO) buffer 30, a transmit FIFO buffer 32, and a FIFO controller 34.

The PCI bus interface unit 16, preferably compliant with the PCI local bus specification (revision 2.0), receives data packets from a host computer's CPU via the PCI bus 12. Each data packet received from the PCI bus 12 includes a header including length information identifying the number of bytes in the packet. The PCI bus interface unit 16, under the control of the DMA buffer management unit 18, receives DMA and burst transfers from the CPU via the PCI bus 12. The data packets received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received packet is passed to the FIFO control 34.

The interface 10 receives packets having variable packet sizes for transmission on the network bus 14. As shown in FIG. 4, the data frame transmitted by the interface 10 onto the network bus 14 may include the LLC data and pad fields having a size varying from 46 to 1500 bytes, such that the final packet length may vary from a minimum of 64 bytes to a maximum of 1518 bytes. Thus, transmit underflow may occur when the data from the transmit FIFO 32 is removed from the network at a rate faster than the rate at which data is transferred into the transmit FIFO 32. Underflow can occur during a packet transmission when there are no more bytes of the current packet in the FIFO to be transmitted, resulting in a retry request that wastes network bandwidth and degrades performance. To avoid underflow, packet transmission by the interface card 10 is initiated after there are a sufficient number of bytes in the FIFO, referred to as the transmit threshold (XMTSP). However, if the threshold is too high, then packet latency will increase.

According to the present invention, an adaptive transmit start point is calculated by the FIFO control 34 as the first few bytes of the packet are loaded into the transmit FIFO 32. Specifically, the FIFO control 34 determines the length of each data packet by receiving from the buffer management unit 18 the data from the length field from the header bytes in the received packet. The FIFO control 34 then measures the time to fill the transmit FIFO 32 with a predetermined minimum number of bytes before transmission thereof ($X_m$), and determines whether the transmit start point for the specific packet should be set at the minimum threshold value ($X_m$), or whether the transmit start point should be adjusted in view of differences between the arrival rate and removal rate from the transmit FIFO buffer 32.

Figure 2:
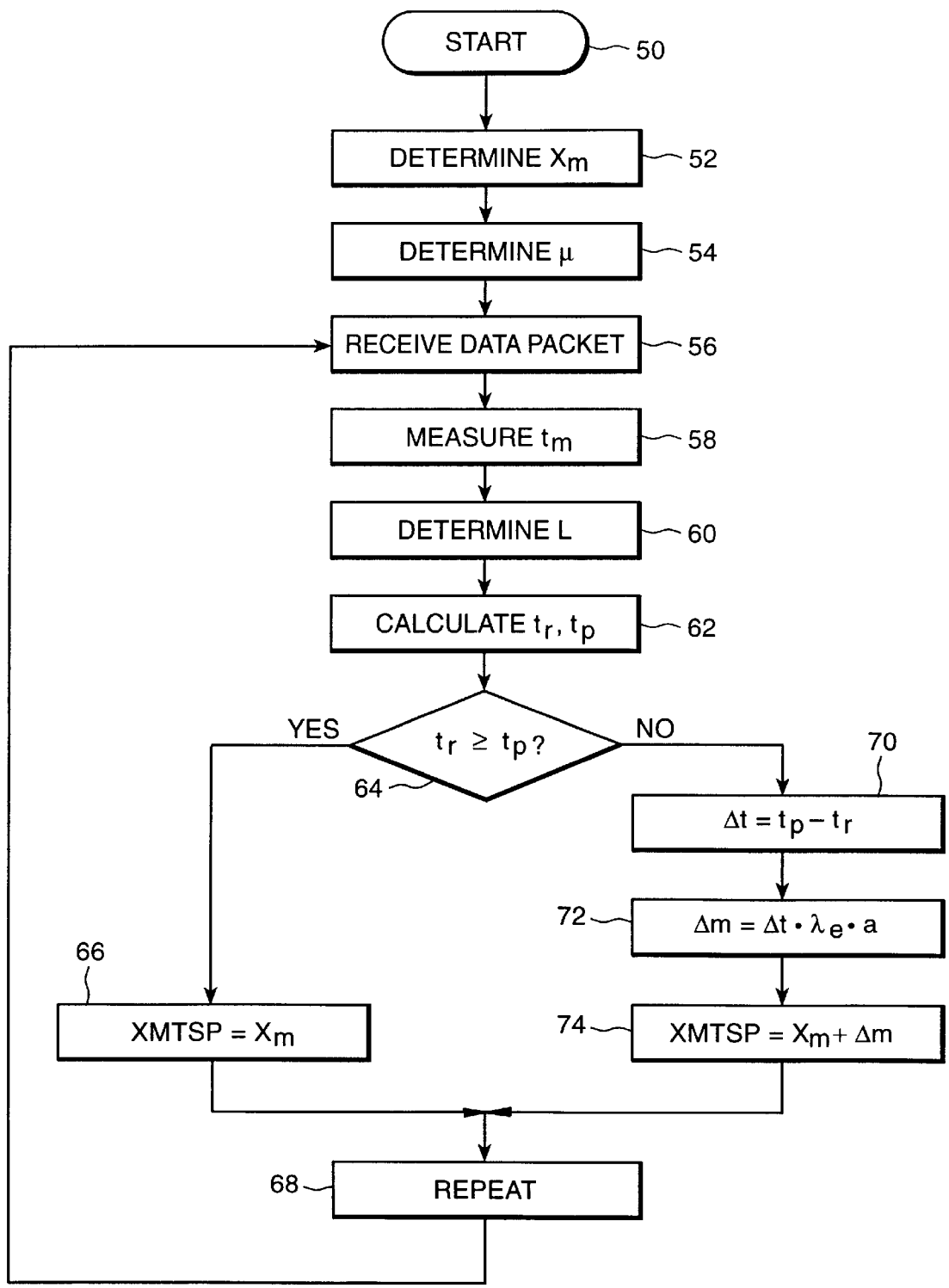
FIG. 2 is a flow diagram of a method for calculating the adaptive transmit start point for each packet according to the preferred embodiment.

FIG. 2 is a flow diagram illustrating the method of calculating a start point for the transmit buffer 32.

The method starts at step 50 at initialization of the interface 10, during which time the FIFO control 34 begins to receive configuration information, for example, from a non-volatile memory, identifying hardware configuration parameters such as the predetermined minimum number of bytes ($X_m$) that must be stored in the FIFO buffer 32 before transmission from the FIFO buffer can begin (step 52). In other words, the value $X_m$ represents the minimum number of bytes that need to be stored in the FIFO buffer 32 in order to avoid transmit underflow, and sets the point when the transmitter actually attempts to transmit packet onto the media, e.g., the bus 14. According to the preferred embodiment, packets have a minimum byte length of 64 bytes and a maximum length of 1518 bytes. Thus, the minimum number of bytes $X_m$ is less than or equal to 64 bytes. Since the length calculation can be received in the first few bytes, the minimum number of bytes ($X_m$) can be as low as sixteen (16) bytes.

The FIFO control 34 then receives information on the removal rate of bytes ($\mu$) from the FIFO 32 by the network in step 54. The removal rate, also referred to as an output transmission rate, is determined in accordance with the data rate of the network bus 14. Hence, the removal rate $\mu$ will have a value of 12.5 Mbyte/s for a 100 Mbit/s network, and 1.2 Mbyte/s for a 10 Mbit/s network. This information may be provided to the FIFO control 34 either by an EPROM, or by the MAC core 22.

The interface 10 next begins to receive data packets from the CPU via the PCI bus 12 on a packet-by-packet basis (step 56). Specifically, the interface 10 receives one or a plurality of burst transmissions for each data packet, whereby the transmission of each packet begins with a plurality of header bytes including a length field that specifies the number of bytes in the packet.

The method then determines in step 58 the time necessary for the minimum number of bytes ($X_m$) to be read into the FIFO 32. This value may be measured by an internal time counter that measures the time $t_m$, or by internal registers. After the arrival time of the predetermined minimum number of bytes ($t_m$) has been determined, the arrival rate of bytes into the FIFO for each packet ($\lambda_e$) is calculated according to the equation:

$$\lambda_e = X_m/t_m.$$

The information on the length field of the received packet is also provided to the FIFO control 34 to determine the length L of the individual packet being received at that time (step 60).

The FIFO control 34 then calculates the total time ($t_p$) to fill the FIFO 32 for the current packet having length L, and the total time ($t_r$) to remove the packet having length L from the FIFO 32 (step 62). The total time to remove the packet ($t_r$) is preferably calculated by dividing the determined length L by the determined data removal rate ($\mu$):

$$t_r = L/\mu.$$

The total time to fill the FIFO 32 ($t_p$) is determined by dividing the length by the arrival rate $\lambda_e$, multiplied by a coefficient (a) that accounts for the burst transmissions on the PCI bus 12 and the PCI bus latency time:

$$t_p = L/\lambda_e * a.$$

After calculating the total time to fill the FIFO 32 with the packet ($t_p$) and the total time to remove the packet from the FIFO 32 ($t_r$), a comparison is made in step 64 to determine whether the total time to remove ($t_r$) is greater than or equal to the total time to fill the FIFO 32 ($t_p$). If the time for removal ($t_r$) is greater than or equal to the time to fill the FIFO 32 ($t_p$), then the calculated arrival rate $\lambda_e$ is greater than the removal rate $\mu$. Hence, the adaptive transmit start point (XMTSP) for the transmit FIFO 32 is set to the minimum value $X_m$ in step 66 to begin removing the data bytes as soon as possible from the transmit FIFO 32. The value of the transmit start point (XMTSP) is thereafter used to control the transmission of the transmit FIFO 32 at the determined start point. Once the entire packet has been transmitted through the FIFO 32, the procedure is repeated in step 68 for the next packet.

If in step 64 the time for removal ($t_r$) of the packet from the FIFO 32 is less than the calculated time for packet filling ($t_p$), then the removal rate is greater than the calculated arrival rate for the packet into the FIFO 32. Thus, the transmit threshold XMTSP is adjusted to ensure that underflow does not occur during transmission of the packet. Specifically, the differential time between packet filling and removal ($\Delta t$) is calculated in step 70. The calculated time differential is then used in step 72 to calculate a differential buffer capacity ($\Delta m$) that equals the time differential ($\Delta t$) times the arrival rate $\lambda_e$ multiplied by the variable factor (a) in order to accommodate the burst transmission characteristics and the bus latency time of the PCI bus 12. The variable factor (a) is determined based upon the characteristics of the PCI bus and generally has a value of between and including 1.0 and 2.0 ($1.0 \leq a \leq 2.0$).

The calculated differential buffer capacity ($\Delta m$) is then added to the minimum threshold $X_m$ in step 74 in order to obtain the adaptive transmit start point for the case where the removal rate is greater than the calculated arrival rate for the current data packet being received.

Thus, the adaptive transmit start point is adjusted for each packet received by the interface 10. When a new data packet is received, the process returns to step 56 in order to begin receiving the data packet, and then measuring the time ($t_m$) necessary to fill the transmit FIFO 32 with the minimum number of bytes in order to calculate the arrival rate.

Figure 3:
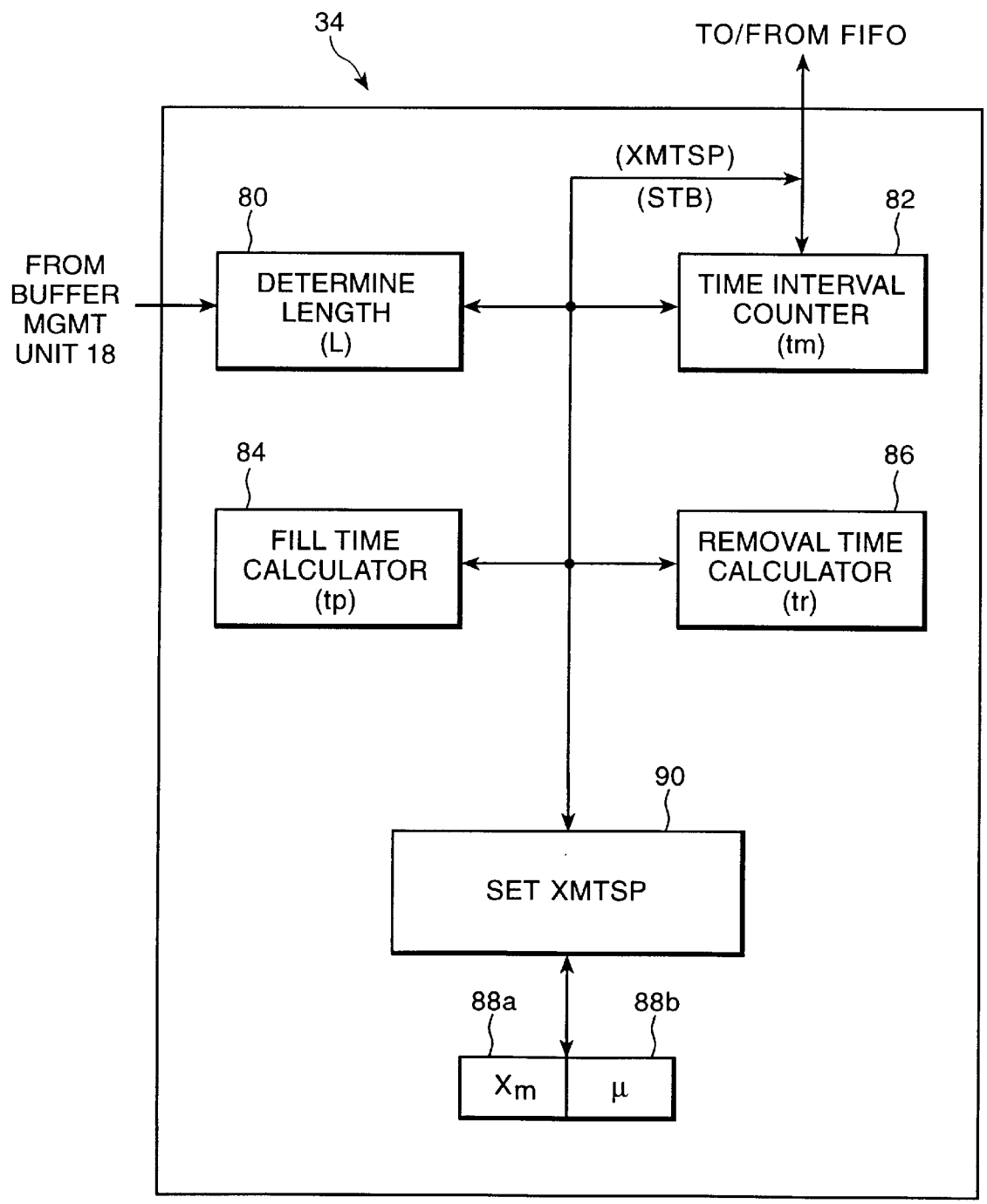
FIG. 3 is a block diagram of the FIFO controller of FIG. 1.

FIG. 3 is a block diagram illustrating the functions of the FIFO control 34 in implementing the method of FIG. 2. The FIFO control 34 includes a length determining unit 80 that receives the length field information from the buffer management unit 18 when a packet is first received by the interface 10. The length determining unit 80 may also receive length information from the packet shown in FIG. 4, received by the interface 10 by the network 14, in order to set the transmit start point for the receive FIFO 30.

The FIFO control 34 also includes a time interval counter 82 for measuring the time necessary to fill the minimum number of bytes into the FIFO ($t_m$). A fill time if calculator 84 calculates the total time ($t_p$) to fill the FIFO for the packet having length L, and the removal time calculator 86 determines the total time to remove the packet having length L from the FIFO ($t_r$).

The FIFO control 34 also includes registers 88a and 88b, which store the predetermined minimum number of bytes ($X_m$) and the removal rate of bytes from the FIFO ($\mu$). Finally, the FIFO control 34 includes the means for setting the transmit start point as described in FIG. 2.

The FIFO control 34 will generally be under the control of the media access control 22. Thus, the calculated adaptive start point would be provided to the MAC 22 so that the MAC could generate a signal to the network identifying that the interface 10 is ready to begin transmission. Depending on the implementation of the interface 10, the setting means 90 can either output the value of the adaptive start point (XMTSP) to the respective FIFO buffers, or alternately, output a transmit strobe (STB), causing the FIFO to begin transmission of the stored data bytes. Alternately, the MAC core 22 can take control and strobe the transmit FIFO 32 to begin transmission at the start point XMTSP.

According to the present invention, the transmit start point is calculated for each received packet. Thus, since packets can have variable length, the present invention provides an optimal start point for each packet in order to minimize transmit underflow and reducing the latency of the interface 10. Moreover, the input rate to the FIFO buffer is determined by measuring the time to fill the buffer with the minimum number of bytes, thereby avoiding a predetermined input rate that may be variable for different length packets.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In an interface having a first in first out (FIFO) buffer and transmitting received packets, a method for setting a transmit start point in the FIFO buffer, comprising:

determining a byte length of each received packet;

measuring a minimum fill time corresponding to a minimum time necessary to fill the FIFO buffer with a predetermined minimum number of bytes of said each received packet before FIFO buffer transmission thereof;

determining an output transmission rate of the FIFO buffer; and setting the transmit start point for said each received packet in accordance with the determined byte length of said each received packet, the minimum fill time and the output transmission rate.

2. The method of claim 1, wherein the setting step comprises:

calculating a FIFO buffer fill time for said each received packet in accordance with the determined byte length and said minimum fill time divided by said predetermined minimum number of bytes;

calculating a FIFO buffer removal time for said each received packet in accordance with the determined byte length divided by the output transmission rate;

assigning the transmit start point for said each received packet to said predetermined minimum number of bytes if the calculated FIFO buffer removal time is greater than or equal to said FIFO buffer fill time.

3. The method of claim 2, wherein if the FIFO buffer removal time is less than the FIFO buffer fill time, said setting step further comprises:

calculating a time differential between the FIFO buffer fill time and the FIFO buffer removal time;

calculating a differential buffer capacity in accordance with said time differential and the predetermined minimum number of bytes divided by the measured minimum fill time; and setting said transmit start point to said predetermined minimum number of bytes plus said differential buffer capacity.

4. The method of claim 2, further comprising receiving at least a portion of said bytes of said each packet during a burst transmission from a PCI bus.

5. The method of claim 4, wherein said step of calculating a FIFO buffer fill time comprises multiplying the determined byte length of said each received packet and the measured minimum time with a coefficient compensating for latency caused by said burst transmission, and dividing the resulting product by the predetermined minimum number of bytes.

6. The method of claim 1, wherein if the FIFO buffer removal time is less than the FIFO buffer fill time, said setting step further comprises:

calculating a time differential between the FIFO buffer fill time and the FIFO buffer removal time;

calculating a differential buffer capacity in accordance with said time differential and the predetermined minimum number of bytes divided by the measured minimum fill time; and setting said transmit start point to said predetermined minimum number of bytes plus said differential buffer capacity.

7. The method of claim 1, wherein said each received packet comprises a header carrying length information, the byte length determining step comprising obtaining said length information from said each received packet.

* * * * *